(12) United States Patent
Sugawara

(10) Patent No.: US 6,558,257 B1
(45) Date of Patent: May 6, 2003

(54) IMAGING PROCESSING APPARATUS AND IMAGE PROCESSING METHOD

(75) Inventor: Masaru Sugawara, Tokyo (JP)

(73) Assignee: Kabushiki Kaisha Sega Enterprises, Tokyo (*) Notice: Subject to any disclaimer, the term of this patent is extended or adjusted under 35 U.S.C. 154(b) by 0 days.

(21) Appl. No.: 09/566,631

(22) Filed: May 8, 2000

Related U.S. Application Data

(62) Division of application No. 08/765,254, filed as application No. PCT/JP96/01249 on May 10, 1996, now Pat. No. 6,102,801.

(30) Foreign Application Priority Data

May 11, 1995 (JP) .............................................. 7-113461

(51) Int. Cl.⁷ .................................................. A63F 9/24
(52) U.S. Cl. ........................................ 463/31; 345/422
(58) Field of Search ............................. 463/1–8, 30–34, 463/36; 345/419, 421, 422, 629–630, 473

(56) References Cited

U.S. PATENT DOCUMENTS

| | | |
|---|---|---|
| 4,600,200 A | 7/1986 | Oka et al. |
| 4,672,541 A | 6/1987 | Bromley |
| 4,895,376 A | 1/1990 | Shiung-Fei |
| 4,905,147 A | 2/1990 | Logg |
| 5,150,899 A | 9/1992 | Kitane |
| 5,299,810 A | 4/1994 | Pierce et al. |
| 5,411,272 A | 5/1995 | Naka et al. |

FOREIGN PATENT DOCUMENTS

EP 0145321 6/1985

OTHER PUBLICATIONS

Tony LaRussa Baseball 3: 1996 Edition, Stormfront Studios, Review by Steve Bauman, 4 pages.*
NBA Live '96, by Electronic Arts, 4 pages.*
Foley et al., "Computer Graphics Principles and Practice", Second Ed., Section 15—Visible–Surface Determination, 1990, pp. 649–717.

* cited by examiner

Primary Examiner—Mark Sager
(74) Attorney, Agent, or Firm—Fish & Richardson P.C.

(57) ABSTRACT

In order to realize the smooth display of a fielder's ball-catching movement, determination of a collision between a batted ball and a fence by an easy method, and an accurate hidden-face treatment for polygons which are located very close to each other, virtual area producing means 31 is provided to produce a collision area for collision determination at a position away from the picture of a ball for a predetermined distance, and determining means 32 is provided to determine at which position in the collision area a fielder is located. When it is determined that the fielder is located in the collision area, picture changing means 33 gradually changes the posture of the fielder from a waiting state to a ball-catching state.

8 Claims, 12 Drawing Sheets

IMAGING PROCESSING APPARATUS AND IMAGE PROCESSING METHOD

This Application is a Divisional of application Ser. No. 08/765,254, filed Mar. 18, 1997, now U.S. Pat. No. 6,102,801 which was the National Stage of International Application No. PCT/JP96/01249, filed May 10, 1996.

TECHNICAL FIELD

The present invention relates to a picture processing device and a method thereof. More particularly, this invention relates to a picture processing device and a method thereof which enable characters to move smoothly in response to a ball in video games which imitate ball games such as baseball or soccer.

BACKGROUND ART

With the progress of computer technology, video game machines (picture processing devices) utilizing computer graphic technique have come to be widely used. Particularly, popularity of video game machines which imitate ball games such as baseball or soccer has been firmly established, and a considerable amount of this type of video game machines have been devised.

However, conventional video game machines have many problems as described below.

First, it is difficult to display a fielder's ball-catching movement smoothly.

A conventional video game machine generally comprises: a display which displays batters, fielders and other characters; an operation stick which operates batters, fielders and other characters on a screen; and a picture processing circuit which displays a desirable image on the screen in accordance with the operation of the operation stick. Such a video game machine is provided with a plane picture called "sprite" for each movement posture of each fielder, and the sprite is displayed according to the progress of a game on the screen. A virtual area called the "collision area" for determination of collision is provided in the vicinity of a fielder. When a ball enters the collision area, the fielder moves to catch the ball.

For example, when a game player operates the stick, the fielder on the screen chases the batted ball in accordance with the operation of the stick. The collision area, then, also moves together with the fielder. If the fielder catches up with the ball and the ball enters the collision area near the fielder, the fielder moves to catch the ball. Namely, the video game machine determines that the ball in the screen has reached close to the fielder, and displays the sprite which shows the ball-catching movement. Therefore, the fielder never begins the ball-catching movement unless the ball enters the collision area on the screen.

However, since the time spent after the ball enters the collision area until the fielder catches the ball is very short, the fielder needs to perform the ball-catching movement in a very short period of time after the ball enters the collision area. Accordingly, the fielder's ball-catching movement turns out to be awkward and it is then difficult to provide a realistic game. As a means for solving this problem, it is possible to enlarge the collision area near the fielder. In other words, it is possible to lengthen the time spent after the ball enters the collision area until the fielder catches the ball. However, if the collision area is enlarged, a problem arises that the fielder begins moving to catch a ball even when the ball is too far away to catch.

Secondarily, a considerable amount of operation is required for a processing which determines the collision between a batted ball and a fence, which subsequently hinders high speed processing.

When a batted ball flies beyond an outfielder in a video game machine, whether or not a collision will take place between the batted ball and the fence is determined. For example, when the fence is displayed with a plurality of polygons, it is determined whether or not coordinates of the ball are located on the polygons. If it is determined that the ball will collide with the polygons which compose the fence, a processing for bounding the ball back from the fence is performed.

Namely, the conventional baseball game determines whether the ball collides with the fence by confirming whether coordinates of the ball are positioned on the polygons which compose the fence. However, since coordinates of the ball and the polygons are expressed by three-dimensional data, a considerable amount of processing is required to determine the position relationship between the ball and the polygons. Therefore, there existed a problem in that a processing speed of the entire game was lowered.

Thirdly, it is difficult to accurately perform a hidden face treatment of polygons which are located very close to each other as in the case of a player's number and a uniform.

In video games such as baseball and soccer, it is desirable to give different player's numbers for different players in order to heighten the realistic excitement of the game. However, if different pictures are prepared for uniforms of different players, an enormous amount of display data would be required. Therefore, a method of preparing a picture of the uniform and a picture of the player's number separately and superimposing the picture of the player's number on the picture of the uniform is taken.

However, when the player's number and the uniform are displayed by means of polygons, the following problems occur. When the polygons overlap one another, a treatment is performed not to display the overlapped portion of the polygons, which is positioned at the back of the other overlapped portion on the screen ("hidden face treatment"). In order to perform this hidden face treatment, the following method ("Z-sorting method") is suggested: priority of respective polygons is determined in accordance with the dimensions of depth-directional coordinates (z-coordinate values) of the polygons, and the polygons are displayed in accordance with the priority. Namely, in the Z-sorting method, a representative point is decided for each polygon and the priority of the polygons is determined in accordance with the dimensions of z-coordinate values of the representative points.

As described above, one representative point must be decided for each polygon when the Z-sorting method is employed. In order to decide a representative point, there are: a method of determining the most front vertex among vertexes of a polygon as its representative point; a method of determining the most back vertex among vertexes of a polygon as its representative point; and a method of determining the center of gravity of a polygon as its representative point. However, whichever method is taken, if two polygons, such as those of a player's number and a uniform, are located very close to each other, in other words, if two sets of z-coordinate values are very close, it is difficult to accurately determine the priority of the polygons. Accordingly, a problematic hidden face treatment is sometimes performed: for example, a player's number is hidden by a uniform.

In order to avoid such a problem, it is possible to give a higher priority to a player's number than to a uniform and to always superimpose the player's number on the uniform. However, this method could cause another problem that when a fielder faces front so that his back is not displayed, his number is still displayed. Accordingly, it has been difficult to accurately apply the hidden face treatment to polygons which are located very close to each other.

The present invention is devised in order to overcome the above-described problems. The first object of this invention is to provide a picture processing device and a method thereof which enable a smooth ball-catching movement.

The second object of this invention is to provide a picture processing device and a method thereof which make it possible to determine a collision between a batted ball and a fence by means of a simple operation.

The third object of this invention is to provide a picture processing device and a method thereof which make it possible to accurately apply the hidden face treatment to polygons which are located very close to each other such as a player's number and his uniform.

DISCLOSURE OF THE INVENTION

The invention described in claim 1 is aimed at achieving the aforementioned first object and is a picture processing device for changing, a shape of a second picture when a first picture collides with the second picture. The picture processing device comprises: virtual area producing means for producing a virtual area at a position away from a position of the first picture, wherein a distance between the virtual area position and the first picture position is determined based on a distance in which the first picture moves in a predetermined time; determining means for determining whether the second picture is located in the virtual area; and picture changing means for changing the shape of the second picture when the second picture is located in the virtual area.

The invention described in claim 2 is aimed at achieving the aforementioned first object and is a picture processing device according to claim 1, comprising position determining means for determining a moving speed and the position of the first picture, wherein the virtual area producing means change a shape of the virtual area based on determination results of the position determining means.

The invention described in claim 3 is aimed at achieving the aforementioned first object and is a picture processing device according to claim 2, wherein the above-mentioned virtual area producing means is aimed at achieving the aforementioned first object and reduces an area of the virtual area in accordance with a decrease in a speed of the first picture.

The invention described in claim 4 is aimed at achieving the aforementioned first object and is a picture processing device according to any one of claims 1 through 3, wherein the virtual area has a major axis along a line perpendicular a direction in which the first picture.

The invention described in claim 5 is aimed at achieving the aforementioned first object and is a picture processing device according to claim 1, wherein the picture changing means produces the second picture in a shape corresponding to the position of the first picture in the virtual area.

The invention described in claim 6 is aimed at achieving the aforementioned first object and is a picture processing device according to claim 1, wherein the picture changing means produces the second picture in a shape corresponding to a height of the first picture from a standard plane picture.

The invention described in claim 7 is aimed at achieving the aforementioned first object and is a picture processing device according to any one of claims 1, 2, 3, 5, or 6, wherein the first picture represents a baseball ball, the second picture represents a baseball fielder, and the picture changing means gradually changes the posture of a fielder according to a ball-catching movement.

The invention described in claim 8 is aimed at achieving the aforementioned third object and is a picture processing device, comprising: coordinate converting means for projecting a plurality of polygons represented in a three-dimensional coordinate system on a two-dimensional coordinate system; and hidden face treatment means for determining the display order of the plurality of polygons projected on the two-dimensional coordinate system on the basis of dimensions of the depth-directional coordinate values of the three-dimensional coordinate system in a display screen and for displaying the polygons with priority in accordance with the determined display order. The hidden face treatment means determines the display order of a polygon group consisting of the plurality of polygons, of which description order is predetermined, on the basis of the depth-directional coordinate values of one polygon composing the polygon group, and respective polygons composing the polygon group are displayed with priority in accordance with the description order only when it is decided to display the polygon group.

The invention described in claim 9 is aimed at achieving the aforementioned third object and is a picture processing device according to claim 8, wherein the hidden face treatment means determines the display order of the polygon group on the basis of the depth-directional coordinate values of a polygon having the highest description order.

The invention described in claim 10 is aimed at achieving the aforementioned third object and is a picture processing device according to claim 8, wherein the above-mentioned one polygon represents a player's number and the other polygon represents a uniform.

The invention described in claim 11 is aimed at achieving the aforementioned second object and is a picture processing device for determining a collision between a curved-face picture having a radius "R" from its center point and the first picture, wherein it is determined that the first picture collides with the curved-face picture when distance "r" calculated from the center point and the first picture reaches distance "R."

The invention described in claim 12 is aimed at achieving the aforementioned second object and is a picture processing device according to claim 11, wherein the curved-face picture represents a baseball fence and the first picture represents a ball.

The invention described in claim 13 is aimed at achieving the aforementioned first object and is a picture processing method for changing a shape of a second picture when a first picture collides with the second picture, the method comprising: producing a virtual area at a position away from a position of the first picture, wherein a distance between the virtual area position and the first picture position is determined based on a first picture moves in a predetermined time; the step of determining whether the second picture is located in the virtual area; and the step of changing the shape of the second picture when the second picture is located in the virtual area.

The invention described in claim 14 is aimed at achieving the aforementioned first object and is a picture processing method according to claim 13, further comprising determining a moving speed and the position of the first picture and changing the shape of the virtual area based on the determined moving speed and position.

The invention described in claim 15 is aimed at achieving the aforementioned third object and is a picture processing method, comprising: the step of projecting a plurality of polygons represented in a three-dimensional coordinate system on a two-dimensional coordinate system; and the step of determining the display order of the plurality of polygons projected on the two-dimensional coordinate system on the basis of dimensions of the depth-directional coordinate values of the three-dimensional coordinate system in a display screen and then displaying the polygons with priority in accordance with the Determined display order. The display order of a polygon group consisting of the plurality of polygons, of which description order is predetermined, is determined on the basis of the depth-directional coordinate values of one polygon composing the polygon group, and respective polygons composing the polygon group are displayed with priority in accordance with the description order only when it is decided to display the polygon group.

The invention described in claim 16 is aimed at achieving the aforementioned second object and is a picture processing method for determining a collision between a curved-face picture having a radius "R" from its center point and a first picture, wherein it is determined that the first picture collides with the curved-face picture when distance "r" calculated between the center point and the first picture reaches distance "R."

According to the invention described in claim 1, the virtual area producing means produces a virtual area at a position away from a position of the first picture, wherein a distance between the virtual area position and the first picture position is determined based on a first picture moves in a predetermined time. Namely, the virtual area is produced at a position away from the first picture for a predetermined distance in a moving direction of the first picture. The determining means determines whether the second picture is located in the virtual area. When the second picture is located in the virtual area, the picture changing means changes the shape of the second picture.

For example, when the second picture representing a fielder enters the virtual area, the posture of the fielder gradually changes from a waiting posture to a ball-catching posture. Then, when the first picture representing a ball reaches the fielder, the posture of the fielder turns to a ball-catching posture. According to this invention, since the virtual area for collision determination is located away from the first picture, it is possible to lengthen the time required after the second picture enters the virtual area until the first picture collides with the second picture. Accordingly, if this invention is applied to a baseball game, it is possible to obtain sufficient time to change the fielder's posture to catch a ball, thereby enabling a smooth ball-catching movement.

According to the invention described in claim 2, the position determining means determines the moving speed and the position of the first picture and the virtual area producing means changes the shape of the virtual area on the basis of the determination results of the position determining means. For example, according to the invention described in claim 3, when the speed of the first picture is low, the virtual area producing means reduces the area of the virtual area. When the speed of the ball (first picture) is low, it is possible to avoid any inconvenience such as the fielder (second picture) beginning the ball-catching movement at a position away from the ball. Namely, it is possible to solve the problem that the fielder jumps at and catches the ball which almost stops.

According to the invention described in claim 4, the virtual area has a major axis along a line perpendicular to a direction in which the first picture moves. Therefore, the fielder (second picture) is capable of catching the ball (first picture) which comes flying to the right or left of the fielder's position.

According to the invention described in claim 5, the picture changing means produces the second picture in the shape corresponding to the position of the first picture in the virtual area. For example, when the fielder (second picture) is located in the middle of the virtual area, the ball (first picture) comes flying toward the front of the fielder and, therefore, the fielder is displayed in the forward-facing posture to catch the ball. On the other hand, when the fielder is located at the end of the virtual area, the ball comes flying toward the side of the fielder and, therefore, the fielder is displayed in the side-facing posture to catch the ball. As described above, it is possible to reproduce the ball-catching movement similar to a real movement by changing the fielder's posture according to the position of the fielder in the virtual area.

According to the invention described in claim 6, the picture changing means produces the second picture in the shape corresponding to the height of the first picture from a standard plane picture. For example, when the position of the ball (first picture) is high from a ground (standard plane picture), the fielder is displayed to catch a fly. When the position of the ball is low, the fielder is displayed to catch a grounder. As described above, it is possible to reproduce the ball-catching movement similar to a real movement by changing the fielder's ball-catching movement according to the height of the ball.

According to the invention described in claim 7, the first picture represents a baseball, the second picture represents a baseball fielder, and the picture changing means gradually changes the posture of the fielder according to the ball-catching movement. Therefore, it is possible to realize a smooth ball-catching movement.

According to the invention described in claim 8, the coordinate converting means projects a plurality of polygons represented in a three-dimensional coordinate system on a two-dimensional coordinate system. The hidden face treatment means determines the display order of the plurality of polygons projected on the two-dimensional coordinate system on the basis of dimensions of the depth-directional coordinate values in a display screen and displays the polygons with priority in accordance with the determined display order. The hidden face treatment means determines the display order of a polygon group consisting of the plurality of polygons, of which description order is predetermined, on the basis of the depth-directional coordinate values of one polygon composing the polygon group. The hidden face treatment means display the respective polygons composing the polygon group with priority in accordance with the description order only when it is decided to display the polygon group.

In other words, in the same polygon group, comparison of the depth-directional coordinate values of respective polygons (for example, by the Z-sorting method) is not conducted, but the polygons are displayed in the predetermined description order. Therefore, it is possible to perform the hidden face treatment accurately even when two polygons are located very close to each other. As shown in the invention described in claim 10, a polygon representing the uniform and a polygon representing the player's number can be displayed accurately.

According to the invention described in claim 9, the hidden face treatment means decides the display order of the polygon group on the basis of the depth-directional coordinate values of a polygon having the highest description order. Therefore, since the present invention can decide the display order of polygon groups in the same manner as that of other polygons, it is possible to secure the compatibility between the conventional hidden face treatment, for example, by the Z-sorting method and the hidden face treatment of this invention.

According to the invention described in claim 11, a curved-face picture having a radius "R" from its center point is assumed and the distance "r" between the first picture and the center point is calculated. The picture processing device then determines that the first picture collides with the curved-face picture when distance "r" reaches distance "R." For example, in the invention described in claim 11, when the curved-face picture represents a baseball fence and the first picture represents a ball, it is possible to easily determine a collision between the ball and the fence by comparing distance "R" with distance "r."

According to the invention described in claim 13, a virtual area is produced at a position away from a position of the first picture, wherein a distance between the virtual area position and the first picture position is determined based on a distance in which the first picture moves in a predetermined time. When it is determined whether the second picture is located in the virtual area, and if it is determined that the second picture is located in the virtual area, the shape of the second picture is changed. For example, according to this invention, since the virtual area for collision determination is located away from the first picture, it is possible to lengthen the time spent after the second picture enters the virtual area until the first picture and the second picture collide with each other. Accordingly, when this invention is applied to a baseball game, it is possible to secure sufficient time to change a fielder's ball-catching posture and to realize a smooth ball-catching movement.

According to the invention described in claim 14, the moving speed and position of the first picture are determined and the shape of the virtual area is changed according to the determined moving speed and position.

According to the invention described in claim 15, the display order of the plurality of polygons projected on the two-dimensional coordinate system is decided on the basis of dimensions of depth-directional coordinate values in the display screen, and the polygons are displayed with priority in accordance with the determined display order. Also, the display order of a polygon group consisting of a plurality of polygons, of which description order is predetermined, is decided on the basis of depth-directional coordinate values of one polygon composing the polygon group. Only when it is decided to display the polygon group, the respective polygons composing the polygon group are displayed with priority in accordance with the description order.

In other words, in the same polygon group, comparison of the depth-directional coordinate values of respective polygons (for example, by the Z-sorting method) is not conducted, but the polygons are displayed in the predetermined description order. Therefore, it is possible to perform the hidden face treatment accurately even when two polygons are located very close to each other.

According to the invention described in claim 16, a curved-face picture having a radius "R" from its center point is assumed and the distance "r" between the first picture and the center point is calculated. When distance "r" reaches distance "R," it is determined that the first picture collides with the curved-face picture. When the curved-face picture represents a baseball fence and the first picture represents a ball, for example, it is possible to easily determine whether or not the ball collides with the fence, by comparing distance "R" with distance "r."

An invention described in claim 17 is a computer-readable memory medium for storing the order in which a picture processing device changes a shape of a second picture when a first picture collides with the second picture. The computer-readable memory medium includes instructions for causing a computer to perform several operations. First the computer produces a virtual area at a position away from a position of the first picture. A distance between the virtual area position and the first picture position is determined based on a distance in which the first picture moves in a predetermined time. Second, the computer determines whether the second picture is located in the virtual area. Third, the computer changes the shape of the second picture when the second picture is located in the virtual area. Examples of such a memory medium include floppy disks, magnetic tapes, photomagnetic disks, CD-ROM, DVD, ROM cartridges, RAM cartridges with battery back-up, and nonvolatile RAM cartridges. The memory medium stores information (mainly digital data and programs) by some physical means and is capable of having a processing device such as computers and private processors perform a certain function.

BEST MODE FOR CARRYING OUT THE INVENTION

The present invention is hereinafter explained in more detail by referring to the attached drawings.

(First Embodiment)
I. Structure

Figure 1:
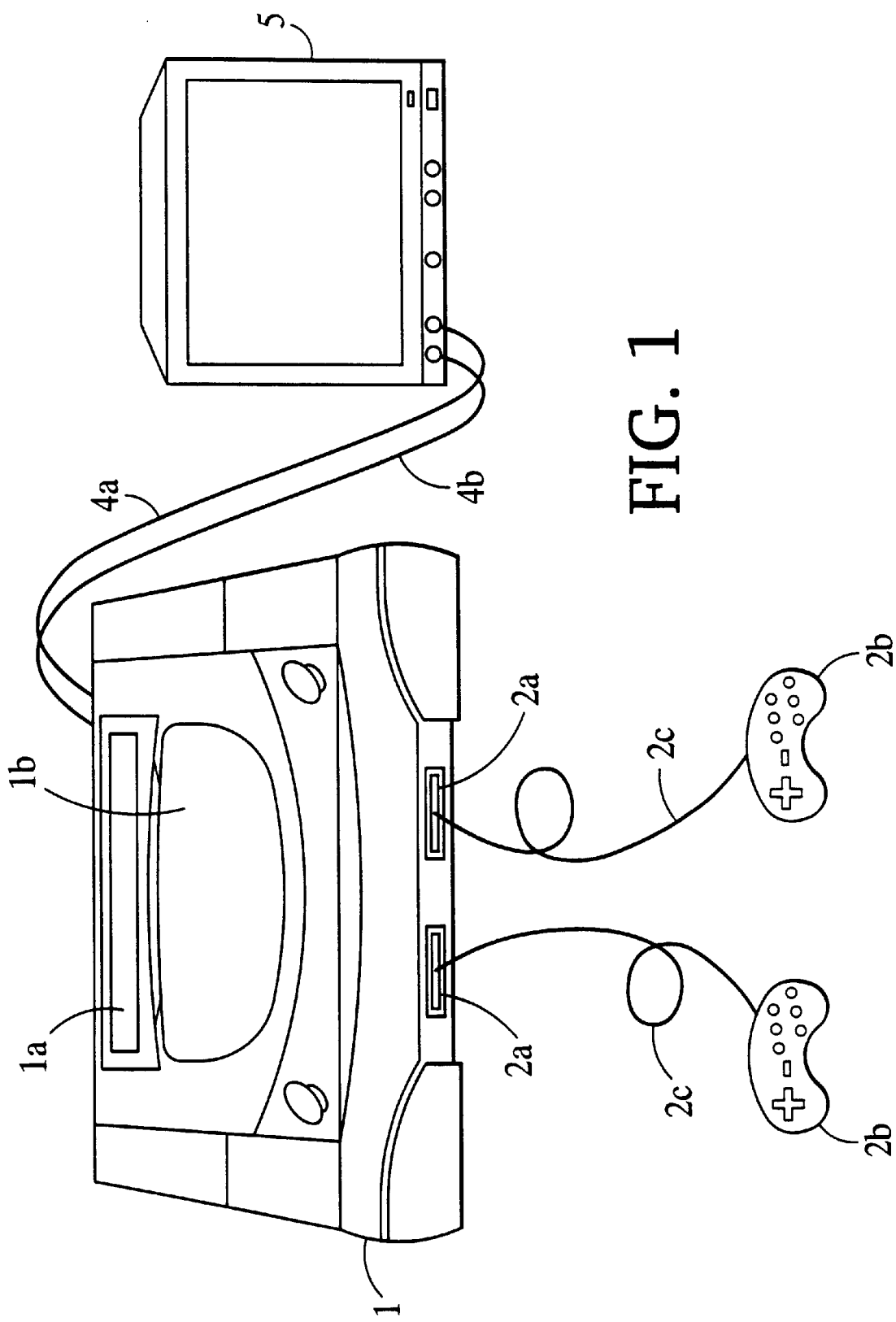
FIG. 1 is an exterior view of a video game machine of a first embodiment of this invention.

FIG. 1 is an exterior view of a video game machine which utilizes the picture processing device of a first embodiment of this invention. In this figure, a main frame 1 of the video game machine has a substantial box shape, inside of which substrates and other elements for game processing are provided. Two connectors 2a are provided at the front side of the main frame 1 of the video game machine, and PADs 2b are connected to these connectors 2a through cables 2c. When two players play a baseball game or other game, two PADs 2b are used.

At the top of the main frame 1 of the video game machine, a cartridge I/F 1a for connection to a ROM cartridge and a CD-ROM drive 1b for reading a CD-ROM are provided. At the back of the main frame 1 of the video game machine, a video output terminal and an audio output terminal (not shown) are provided. This video output terminal is connected to a video input terminal of a TV picture receiver 5 through cable 4a, and the audio output terminal is connected to an audio input terminal of the TV picture receiver 5 through cable 4b. With this video game machine, a user can play a game while watching a screen displayed on the TV picture receiver 5 by operating PAD 2b.

Figure 2:
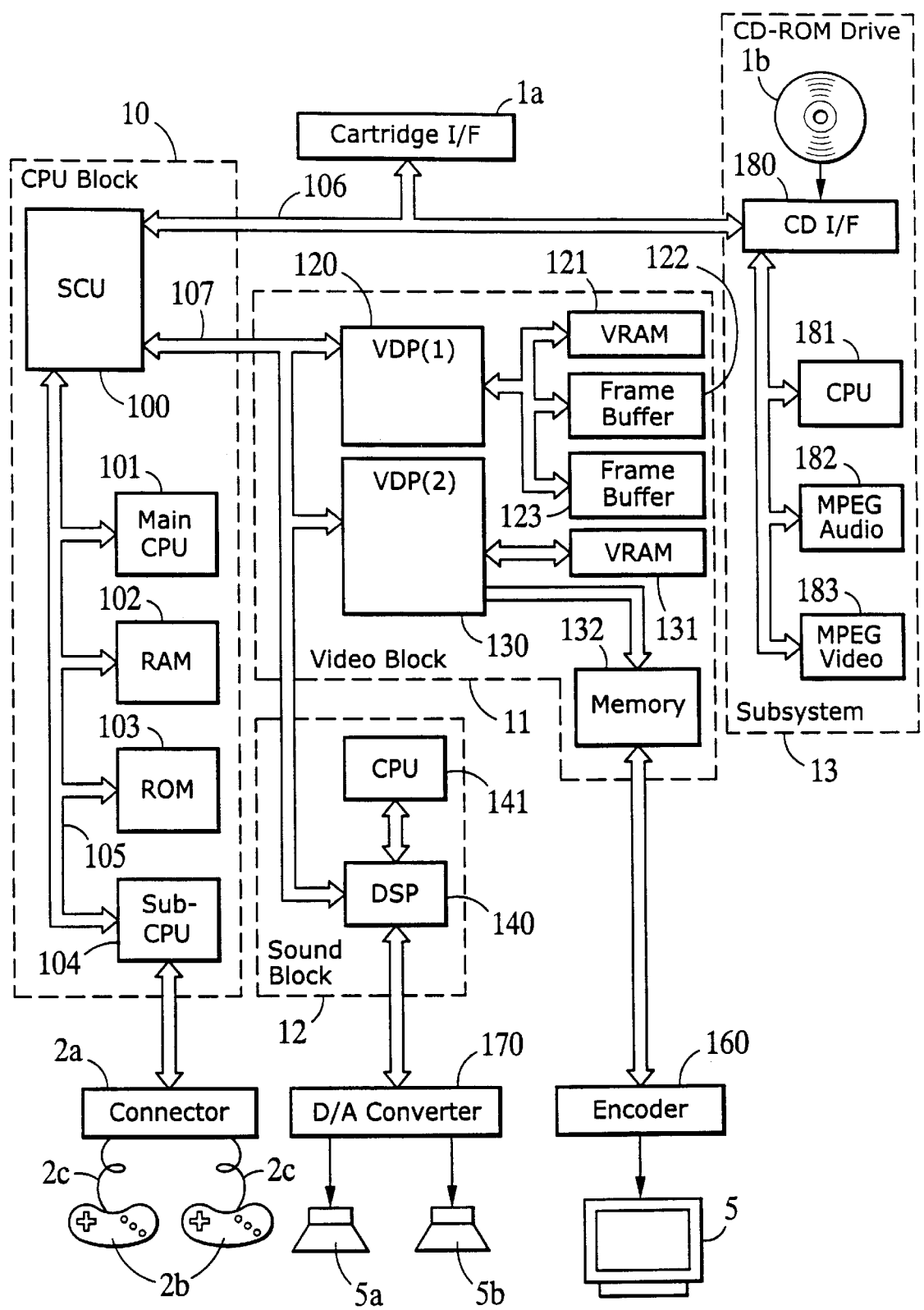
FIG. 2 is a schematic block diagram of the video game machine of the first embodiment of this invention.

FIG. 2 is a block diagram showing the outline of the video game machine of this invention. This picture processing device is composed of a CPU block 10 for controlling the entire device, a video block 11 for controlling the display of a game screen, a sound block 12 for generating sound effects, etc., subsystem 13 for reading CD-ROM and other elements.

The CPU block 10 is composed of SCU (System Control Unit) 100, a main CPU 101, RAM 102, ROM 103, cartridge I/F 1a, sub-CPU 104, CPU bus 103 and other elements. The main CPU 101 controls the entire device. This main CPU 101 has an operational function inside as that of DSP (Digital Signal Processor) and is capable of executing application software at a high speed. RAM 102 is used as a work area for the main CPU 101. An initial program for initialization and other programs are written in ROM 103. SCU 100 controls buses 105, 106 and 107 to perform smooth data input and output between the main CPU 101, VDPs 120 and 130, DSP 140, and CPU 141. SCU 100 comprises a DMA controller inside, thereby being capable of transferring sprite data in a game to VRAM in the video block 11. Accordingly, it is possible to execute an application software such as a game at a high speed. The cartridge I/F 1a is used to input an application software which is supplied in the form of a ROM cartridge.

The sub-CPU 104 is the so-called SMPC (System Manager & Peripheral Control) and has functions, for example, to collect peripheral data from PAD 2b through connector 2a upon request from the main CPU 101. The main CPU 101 performs processing, for example, to move a fielder in a game screen in accordance with the peripheral data received from sub-CPU 104. Optional peripherals, including PAD, a joy stick and a keyboard, can be connected to connector 2a. Sub-CPU 104 has functions to automatically recognize the type of a peripheral connected to connector 2a (terminal at the main frame side) and to collect peripheral and other data in accordance with a communication method corresponding to the type of the peripheral.

The video block 11 comprises VDP (Video Display Processor) 120 for drawing characters consisting of polygon data for a video game, and VDP 130 for, for example, drawing a background screen, synthesizing polygon picture data and the background picture, and performing a clipping processing. VDP 120 is connected to VRAM 121 and frame buffers 122 and 123. Polygon drawing data which represent characters of the video game machine are sent from the main CPU 101 to SCU 100 and then to VDP 120. The polygon drawing data are then written in VRAM 121. The drawing data written in VRAM 121 are used for drawing in a drawing frame buffer 122 or 123, for example, in the 16 or 8 bit/pixel format. The data drawn in the frame buffer 122 or 123 are sent to VDP 130. The main CPU 101 gives information for drawing control to VDP 120 through SCU 100. VDP 120 then executes a drawing processing by following the directions.

VDP 130 is connected to VRAM 131 and it is constructed in a manner such that the picture data from VDP 130 are outputted to encoder 160 through memory 132. Encoder 160 adds synchronization signals, etc. to the picture data, thereby generating picture signals which are then outputted to the TV picture receiver 5. Accordingly, a baseball game screen is displayed on the TV picture receiver 5.

The sound block 12 is composed of DSP 140 for synthesizing sound by a PCM method or FM method, and CPU 141 for controlling DSP 140. Sound data generated by DSP 140 are converted into two-channel signals by a D/A converter 170, which are then outputted to speaker 5b.

The subsystem 13 is composed of a CD-ROM drive 1b, CD I/F 180, CPU 181, MPEG AUDIO 182, MPEG VIDEO 183 and other elements. This subsystem 13 has functions, for example, to read in an application software supplied in the form of a CD-ROM and to reproduce animation. The CD-ROM drive 1b reads data from a CD-ROM. CPU 181 performs processing such as control of the CD-ROM drive 1b and correction of errors in the read data. The data read from a CD-ROM are supplied to the main CPU 101 through CD I/F 180, bus 106 and SCU 100 and are utilized as an application software. MPEG AUDIO 182 and MPEG VIDEO 183 are devices for restoring data which are compressed in MPEG (Motion Picture Expert Group) standards. Restoration of MPEG compressed data, which are written in a CD-ROM, by using these MPEG AUDIO 182 and MPEG VIDEO 183 makes it possible to reproduce animation.

Figure 3:
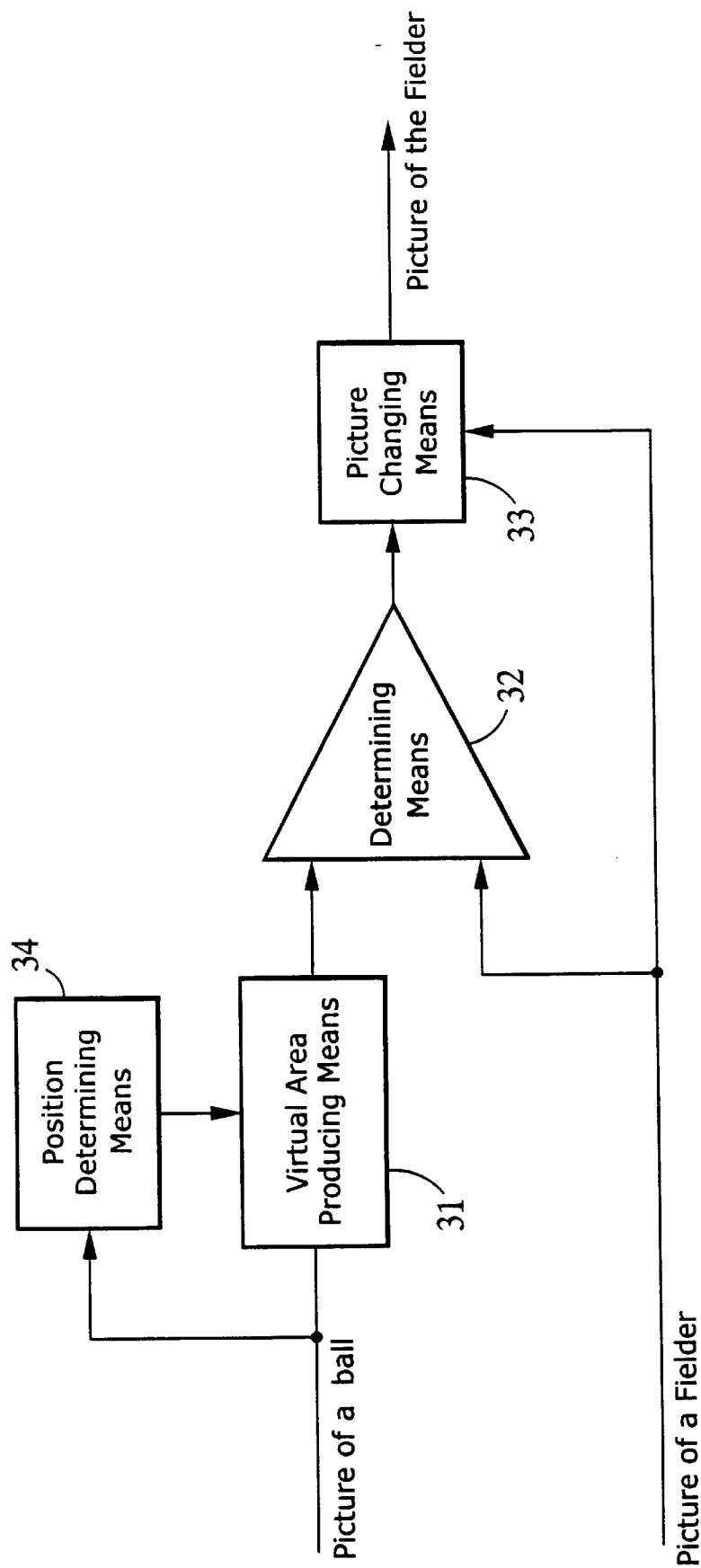
FIG. 3 is a functional block diagram of a picture processing device of the first embodiment of this invention.

The structure of the picture processing device of this embodiment is hereinafter explained. FIG. 3 is a functional block diagram of the picture processing device which is composed of the main CPU 101, RAM 102, ROM 103 and other elements. In this figure, virtual area producing means 31 has a function to generate a collision area (virtual area) at a position ahead of the moving direction of a ball (first picture). Position determining means 34 determines the speed and height (position) of the ball and gives the determination results to the virtual area producing means 31. Determining means 32 determines a position relationship between the collision area and a fielder and gives the determination results to picture changing means 33. The picture changing means 33 changes the posture of the fielder (second picture) on the basis of the determination results (the position relationship between the collision area and the fielder) of the determining means 32. Namely, once the fielder enters the collision area, the fielder moves to catch the ball.

Figure 4:
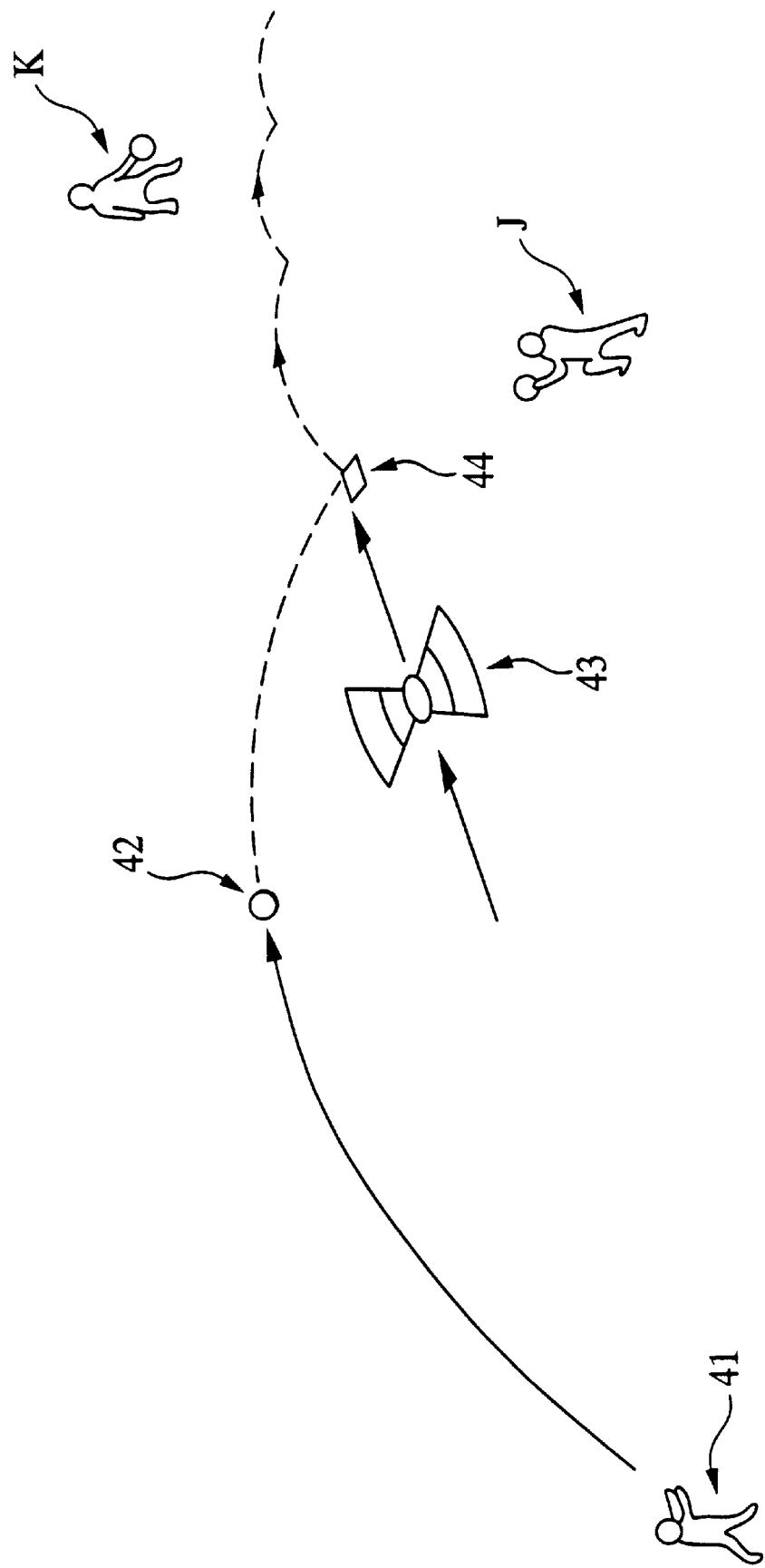
FIG. 4 shows a baseball game screen of the first embodiment of this invention.

FIG. 4 shows an example of a baseball game screen to be displayed by the video game machine of this embodiment. This baseball game can be executed by one or two persons. Namely, when there are two game players, the players take turns to play the defending team or the team at bat. When there is only one game player, the player takes to the field and goes to bat in turn by setting the computer (video game machine) as his/her competitor team. A scene corresponding to the progress of a game is displayed on display 5 in three-dimensional graphics. When a pitcher throws a ball, a scene is displayed as shown from the back of a batter. Immediately after the batter hits the ball, a scene mainly focused on fielders is displayed as shown in FIG. 4.

Fielders J and K can be moved by operating PAD 2b. Namely, when the game player operates PAD 2b, the main CPU 101 first moves fielder J, who is located in the infield, among fielders J and K who are located in a direction toward which the ball 42 flies. If fielder J fails to catch the ball, the main CPU 101 moves fielder K in the outfield in accordance with the operation of PAD 2b. Accordingly, a plurality of fielders can be moved by easy operation.

At the same time as batter 41 hits a ball, the main CPU 101 calculates the speed and direction of ball 42 and then calculates an estimated drop point 44 where ball 42 may drop on the basis of the calculation results obtained above. This estimated drop point 44 is actually displayed on the screen. When fielder J or K is moved near the estimated drop point 44 before ball 42 drops, fielder J or K can catch a fly.

A virtual collision area 43 is located on the ground (standard plane picture) in the direction toward which the ball 42 flies (forward direction). This collision area 43 is used for collision determination between ball 42 and a fielder and is not actually displayed. When fielder J or K moves into the collision area 43, fielder J or K can catch ball 42. On the other hand, while fielder J or K is located outside the collision area 43, fielder J or K does not move to catch the ball.

Figure 5:
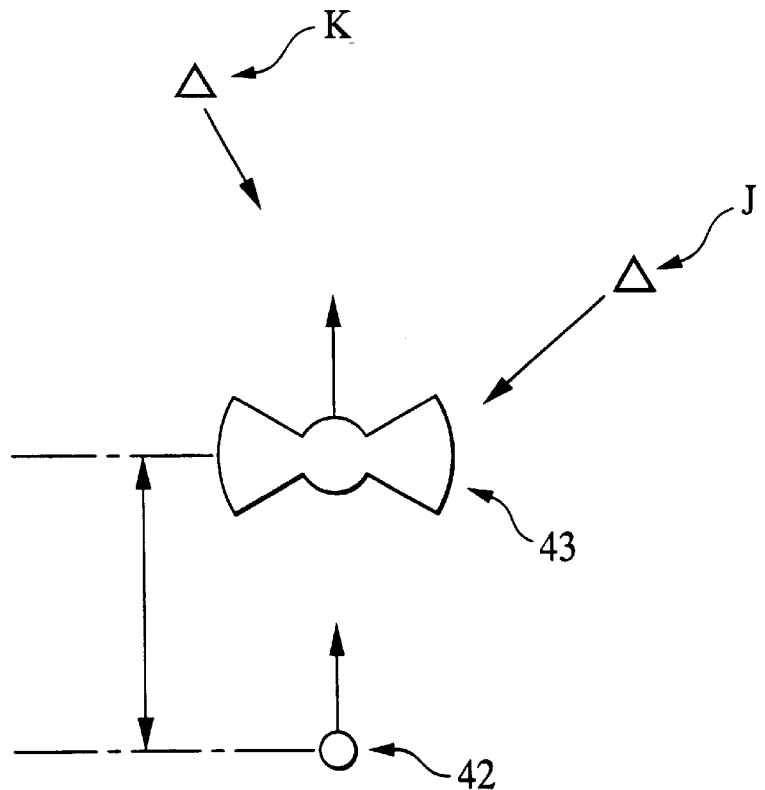
FIG. 5 shows a position relationship between a collision area, ball and fielder of the first embodiment of this invention.

The collision area is hereinafter explained in more detail by referring to FIGS. 5 through 9. FIG. 5 describes a position relationship between the collision area, ball and fielders. As shown in this figure, the collision area 43 is located on the ground away from and ahead of ball 42 for a predetermined distance. Namely, the collision area 43 moves on the ground to come ahead of ball 42 as ball 42 flies. The distance between the collision area 43 and ball 42 corresponds to a distance in which ball 42 moves in a period of time corresponding to twelve interrupts.

Figure 6:
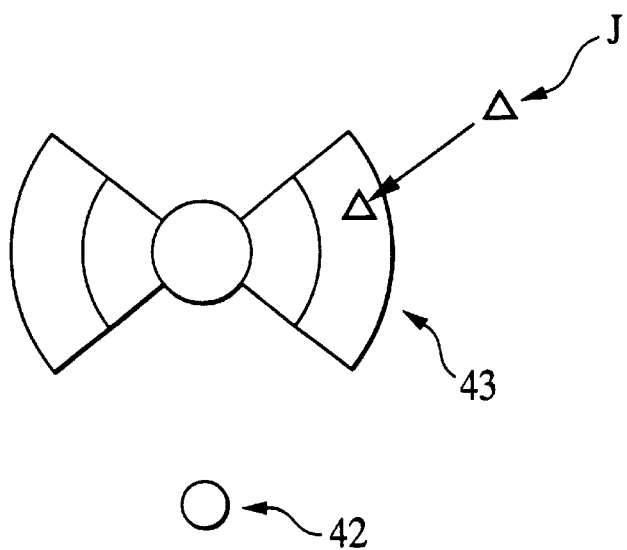
FIG. 6 shows the state in which a fielder enters a collision area in the first embodiment of this invention.

In this embodiment, one interrupt is generated for every frame (vertical retrace line cycle: 1/60 msec×2=33.3 msec). Therefore, a period of time corresponding to twelve interrupts is approximately 0.4 sec. Since the posture of fielder J or K changes every interrupt (every frame), the fielder can make movements of twelve scenes in a period of time corresponding to twelve interrupts. For example, as shown in FIG. 6, fielder J can execute movements of twelve scenes as turning toward the ball during a period of time after fielder J entering into the collision area 43 begins the ball-catching movement until he completes the ball-catching movement. Therefore, it is possible to display the fielder's ball-catching movement smoothly.

Figure 7:
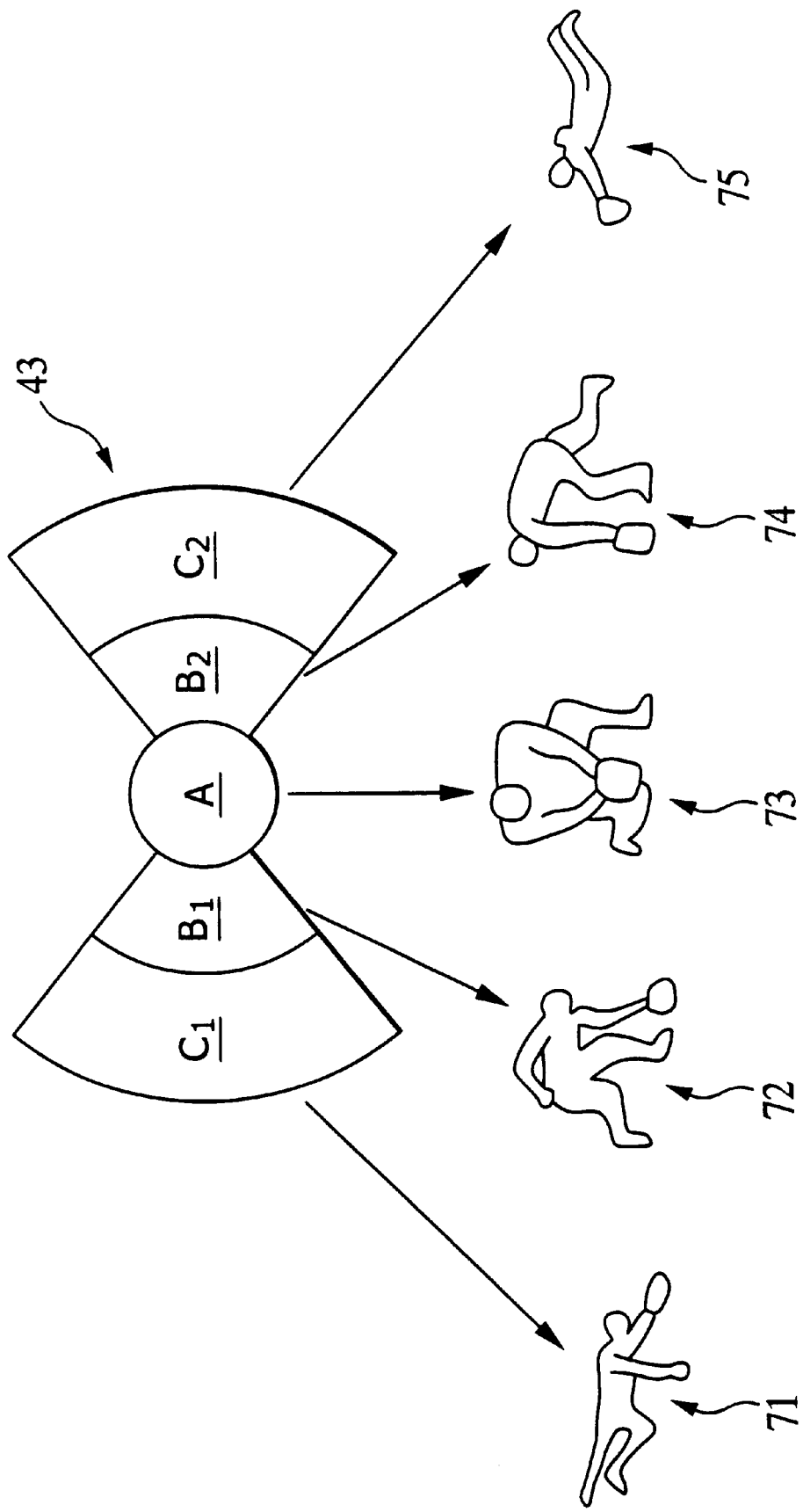
FIG. 7 shows how each area of the collision area corresponds to a ball-catching posture in the first embodiment of this invention.

FIG. 7 describes the collision area 43 and the ball-catching postures. As shown in this figure, the collision area 43 is composed of areas A, $B_1$, $B_2$, $C_1$ and $C_2$. The areas A, $B_1$, $B_2$, $C_1$ and $C_2$ respectively correspond to the fielder's ball-catching postures 71–75. For example, when the fielder enters area A, the ball comes at the front of the fielder and, therefore, the fielder takes a ball-catching posture 73. When the fielder enters area $C_1$, the ball comes to the left side of the fielder, that is, the ball passes through area A and, therefore, the fielder takes a ball-catching posture 71. The ball-catching postures 71–75 are examples of the postures when the height of the ball is low. An appropriate ball-catching posture is selected according to the height of the ball.

Figure 8:
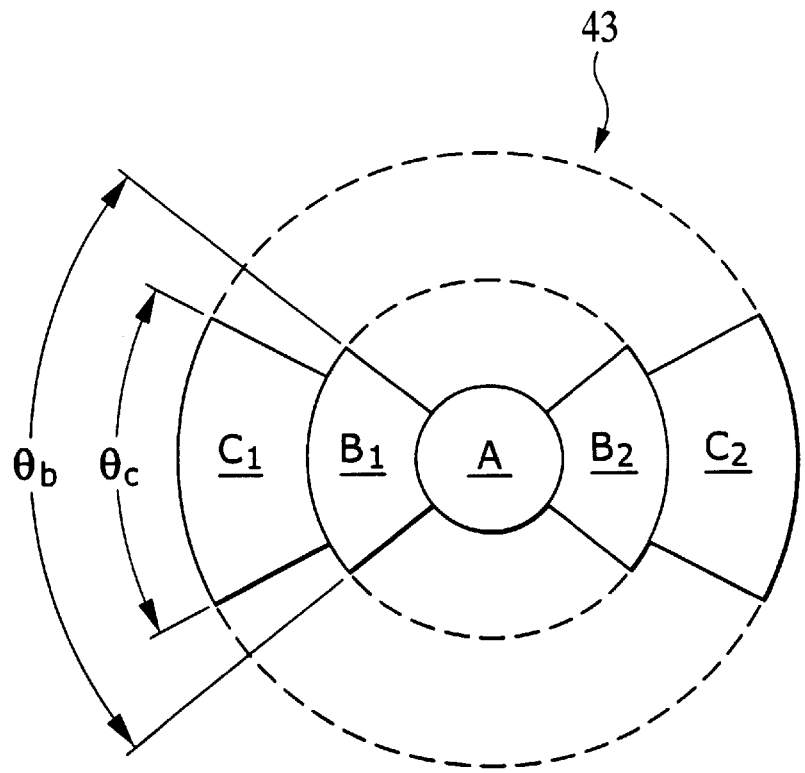
FIG. 8 explains details of the collision area of the first embodiment of this invention.

FIG. 8 is a top view of the collision area. As described above, the collision area 43 is composed of the areas A, $B_1$, $B_2$, $C_1$ and $C_2$. The center area A is positioned along the ball flying path and is circular. Areas $B_1$, $B_2$, $C_1$ and $C_2$ respectively in a fan shape are provided in order outside of area A. Areas $B_1$, $B_2$, $C_1$ and $C_2$ successively disappear as the speed of the ball slows down. For example, when the ball bounds on the ground and the speed of the ball slows down, areas $C_1$ and $C_2$ first disappear.

As the speed of the ball further slows down, areas $B_1$ and $B_2$ disappear and only area A remains. In an actual baseball game, a fielder usually never jumps at a ball when the ball almost stops (see the ball-catching postures 71 and 75 in FIG. 7). Accordingly, it is possible to make the movement of the fielder in the screen closer to the movement of a real fielder by appropriately changing the size of the collision area 43 according to the speed of the ball.

An effective angle $\Theta_b$ of areas $B_1$ and $B_2$ and an effective angle $\Theta_c$ of areas $C_1$ and $C_2$ also change according to the speed of the ball and other factors. For example, when the speed of the ball is high, the fielder must be quickly moved to the position where the ball passes. If the area of the collision area 43 is small, it is very difficult to catch the ball. Therefore, in this case, the effective angles $\Theta_b$ and $\Theta_c$ are made wider and the collision area 43 is made larger, thereby reducing the difficulty in catching the ball which flies at a high speed.

Figure 9:
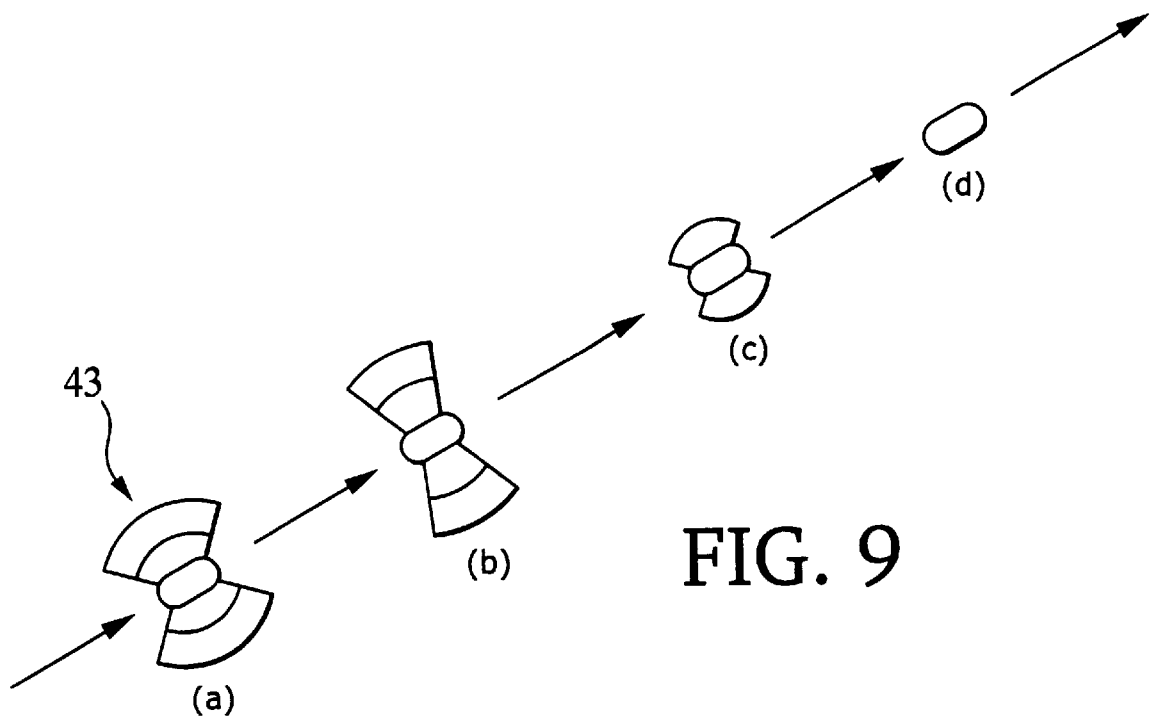
FIG. 9 explains changes in the shape of the collision area in the first embodiment of this invention.

FIG. 9 describes changes in the shape of the collision area 43 in accordance with the movement of the ball. After the ball is hit and until it stops, the collision area 43 passes through positions (a) through (d) in order. The position (a) indicates the position of the collision area immediately after the ball is hit. As described above, when the speed of the ball is high, the effective angles $\Theta_b$ and $\Theta_c$ are made wider in order to reduce the difficulty in catching a ball. On the other hand, when the speed of the ball slows down, the effective angles $\Theta_b$ and $\Theta_c$ are made narrower and the area of the collision area 43 is made smaller (position (b)).

As the ball slows down and reaches the position (c), areas $C_1$ and $C_2$ of the collision area 43 disappear. Immediately before the ball stops (position (d)), areas $B_1$ and $B_2$ of the collision area 43 disappear. Then, only the circular area A remains as the collision area 43. Therefore, the fielder can catch the ball at his front. As described above, it is possible to reproduce realistic ball-catching movements of a fielder by changing the shape of the collision area 43 according to the speed of the ball.

Figure 10:
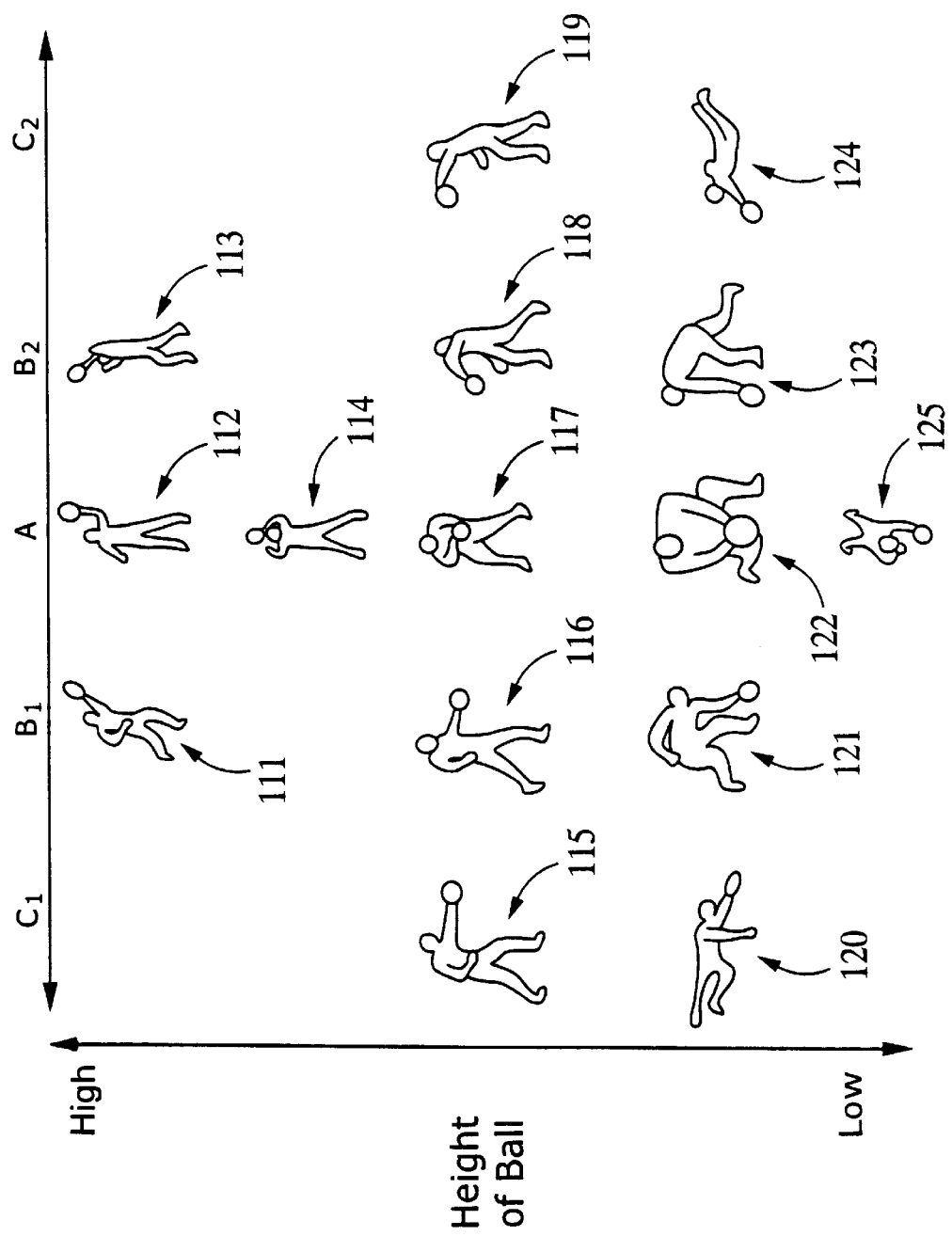
FIG. 10 describes ball-catching postures of a fielder in the first embodiment of this invention.

FIG. 10 shows the fielder's ball-catching postures according to the positions of the fielder in the collision area and the height of the ball. In this figure, the vertical axis indicates the height of the ball and the horizontal axis indicates the position of the fielder. The ball-catching postures 111–113 show the fielders jumping at the ball to catch it. The ball-catching posture 114 shows the fielder catching a fly The ball-catching postures 115–119 show the fielders catching the ball at the height of their chest. The ball-catching postures 120–124 show the fielders taking a grounder. The ball-catching posture 125 shows the fielder jumping forward to catch the ball. Among these ball-catching postures, the ball-catching postures 115, 119, 120 and 124 show the fielder moving and catching the ball.

An appropriate ball-catching posture is selected in accordance with the position of the fielder in the collision area. For example, when the fielder is in area A and the ball is at a high position (a fly), the ball-catching posture 114 with a glove held upward is displayed. When the fielder is in area $C_1$ and the ball is at the fielder's chest height, the ball-catching posture 115 with the glove held toward the left side of the fielder is displayed. Accordingly, it is possible to provide a fully realistic baseball game by changing the fielder's ball-catching posture according to the position of the fielder in the collision area and the height of the ball.

II. Actions

Actions of the device for determining the picture position of this embodiment are hereinafter explained by referring to the flow-charts shown in FIGS. 11 and 12.

Figure 11:
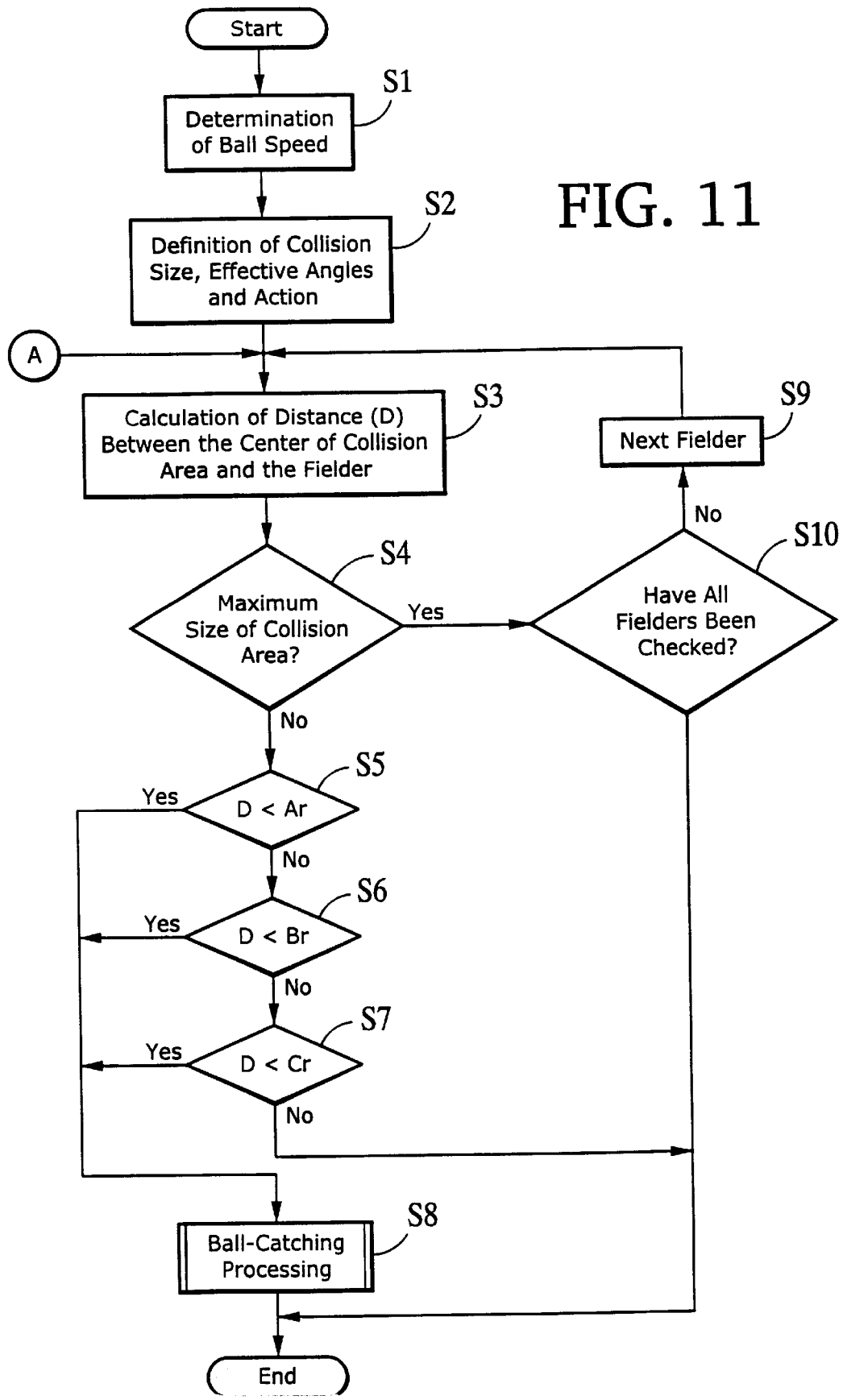
FIG. 11 is a flow-chart showing actions of the video game machine of the first embodiment of this invention.

FIG. 11 is a flow-chart showing actions of the video game machine which utilizes picture processing. This flow-chart is executed at every interrupt (every frame) on the condition that the ball is hit by a batter. First, the position determining means 34 determines the moving direction, angle and speed of the ball immediately after it is hit (at step S1). The virtual area producing means 31 then decides the shape (size and effective angles) of the collision area 43 according to the speed of the ball. For example, when the speed of the ball is high immediately after it is hit, the effective angle $\Theta_b$ of areas $B_1$ and $B_2$ and the effective angle $\Theta_c$ of areas $C_1$ and $C_2$ in the collision area 43 are made wider (FIGS. 8 and 9). The collision area 43 thereby determined is positioned on the ground away from and ahead of the ball for a predetermined distance. The distance between the collision area 43 and the ball corresponds to a distance in which ball 42 moves during a period of time corresponding to twelve interrupts. The collision area 43 is not actually displayed on the screen.

The virtual area producing means 31 matches the fielder's ball-catching posture with area A, $B_1$, $B_2$, $C_1$ or $C_2$ of the collision area 43 (at step S2). For example, as shown in FIG. 10, area A is matched with the ball-catching posture in which the fielder catches the ball at his front. Areas $B_1$, $B_2$ $C_1$ and $C_2$ are respectively matched with an appropriate ball-catching posture in which the fielder catches the ball on his side.

The determining means 32 selects one fielder (positioned near the ball) out of all fielders, who has a possibility to catch the ball, and calculates distance D between the fielder and the center position of the collision area 43 (at step S3). In FIG. 1, for example, if fielder J is selected, distance D between fielder J and the center position of the collision area 43 is calculated. If distance D is longer than a maximum radius of the collision area 43, that is, if fielder J is positioned outside the collision area 43 (YES at S4), the determining means 32 executes a processing of S10.

At step S10, the determining means 32 determines whether or not a fielder, other than fielder J, exists who has a possibility to catch the ball. If fielder K exists, other than fielder J, who has a possibility to catch the ball, the processing object is then turned to fielder K (at step S9). Then the aforementioned processing of S3 and S4 is executed with regard to fielder K. If it is determined as a result of the above processing that distance D between fielder K and the center position of the collision area 43 is longer than the maximum size of the collision area 43, processing S10 is executed. At step S10, if the determining means 32 determines that no fielder exists, other than fielders J and K, who has a possibility to catch the ball (YES at S10), the processing of this flow-chart terminates and returns to a main flow-chart which is not shown in this figure.

Subsequently, an interrupt generates every frame and the above-described flow-chart of FIG. 10 is repeatedly executed. As a predetermined period of time passes after the ball is hit, the ball moves and the speed and height, etc. of the ball change. The ball position determining means 34 determines the moving direction, angle and speed of the ball (at step S1), and the virtual area producing means 31 newly decides the shape (size and effective angles) of the collision area 43 according to the speed of the ball. For example, when the speed of the ball slows down, the effective angles $\Theta_b$ and $\Theta_c$ of the collision area 43 are made narrower.

Assuming that the game player operates PAD 2b to cause fielder J to enter the collision area 43, the determination result of step S4 will become "NO" and the processing at S5 and the following steps will be executed. The determining means 32 determines whether or not distance D is shorter than radius Ar of area A, that is, whether or not fielder J is in the area A (at step S5). If the determination result is "NO," the determining means 32 determines whether or not distance D is shorter than radius Br of area $B_1$ or $B_2$ (at step S6). If the determination result is "NO," it determines whether or not distance D is shorter than radius Cr of area $C_1$ or $C_2$ (at step S7). Namely, the determining means 32 determines in which area of the collision area 43 fielder J is positioned at steps S5 through S7.

For example, if the determining means 32 determines that fielder J is in area $B_1$ (YES at S6), a subroutine of S8 is executed.

Figure 12:
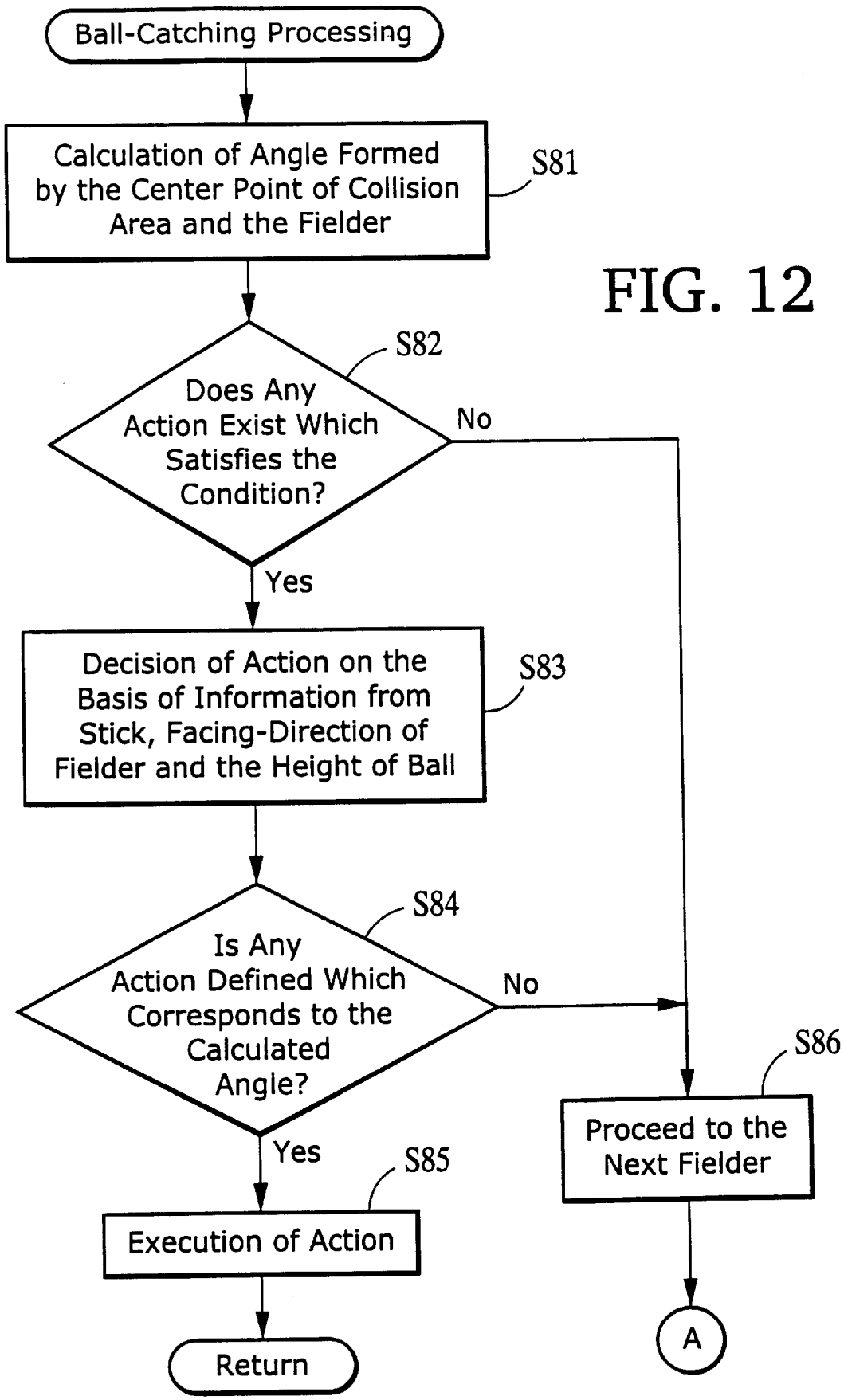
FIG. 12 is a flow-chart showing actions of the video game machine of the first embodiment of this invention.

FIG. 12 shows the subroutine of S8. At step S81, the picture changing means 33 calculates an angle formed by the center point of the collision area 43 and the fielder J. The picture changing means 33 determines whether or not a ball-catching posture corresponding to the calculated angle is defined (at step S82). If the ball-catching posture is not defined (NO at step S82), the processing proceeds to the next fielder (at step S86) and then returns to the main flow-chart shown in FIG. 11. For example, if fielder J enters the left side (area $B_1$) of the collision area 43, the ball-catching posture 115 shown in FIG. 10 is defined (YES at step S82) and, therefore, the processing at step S83 and the following steps are executed.

The picture changing means 33 decides an accurate ball-catching posture on the basis of information given by PAD (or stick) 2b, the facing direction of the fielder, the height of the ball and other factors (at step S83). If such determined ball-catching posture does not exist (NO at step S84), the processing proceeds to the next fielder, for example, fielder K (at step S86) and then returns to the main flow-chart shown in FIG. 11. On the other hand, if the ball-catching posture determined at step S83 exists (YES at step S84), the posture of fielder J on the screen is changed to the determined ball-catching posture (at step S85) and the processing then returns to the main flow-chart shown in FIG. 11 and terminates. After the fielder to catch the ball is determined in the above-described manner, the subroutine shown in FIG. 12 is not executed and a posture changing processing not shown in the drawings is executed at every interrupt. This posture changing processing gradually changes the posture of fielder J every frame. When twelve interrupts have passed after fielder J begins the ball-catching movement, the ball is caught by the glove of fielder J.

According to this embodiment, it is possible to make a fielder perform movements of twelve interrupts (twelve frames) after the fielder enters the collision area 43, thereby making it possible to reproduce a realistic ball-catching movement. Moreover, it is possible to reproduce a fully realistic ball-catching movement by changing the ball-catching movement according to the position of the fielder in the collision area 43.

(Second Embodiment)

A video game machine of a second embodiment has a function concerning the display of a player's number in addition to the functions of the video game machine of the first embodiment. This function is hereinafter explained by referring to FIGS. 13 and 14.

Figure 14:
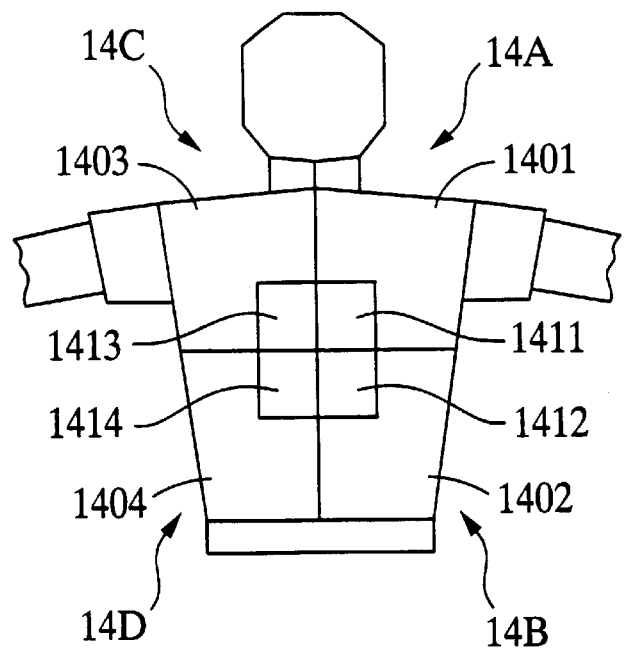
FIG. 14 shows actions of the video game machine of the second embodiment of this invention.

FIG. 14 describes a data structure of polygons representing the upper half of a player's body. In this figure, a uniform is composed of four polygon groups 14A, 14B, 14C and 14D. Each polygon group is composed of a polygon representing a part of the uniform and a polygon representing a part of the player's number. Namely, polygon 14A consists of polygon 1401 representing a quarter part of the uniform and polygon 1411 representing a quarter part of the player's number. Similarly, the polygon group 14B consists of polygons 1402 and 1412, the polygon group 14C consists of polygons 1403 and 1413, and the polygon group 14D consists of polygons 1404 and 1414.

The description order (priority order) of a polygon is set for each of the polygon groups 14A, 14B, 14C and 14D. For example, for the polygon group 14A, the description order is decided in the order of the uniform polygon 1401 and then the player's number polygon 1411. Also, a polygon having the highest description order in the respective polygon groups 14A, 14B, 14C and 14D is selected as the polygon representing each polygon group. Namely, the polygons 1401, 1402, 1403 and 1404 representing the uniform are respectively selected as the polygons representing the respective polygon groups 14A, 14B, 14C and 14D.

Figure 13:
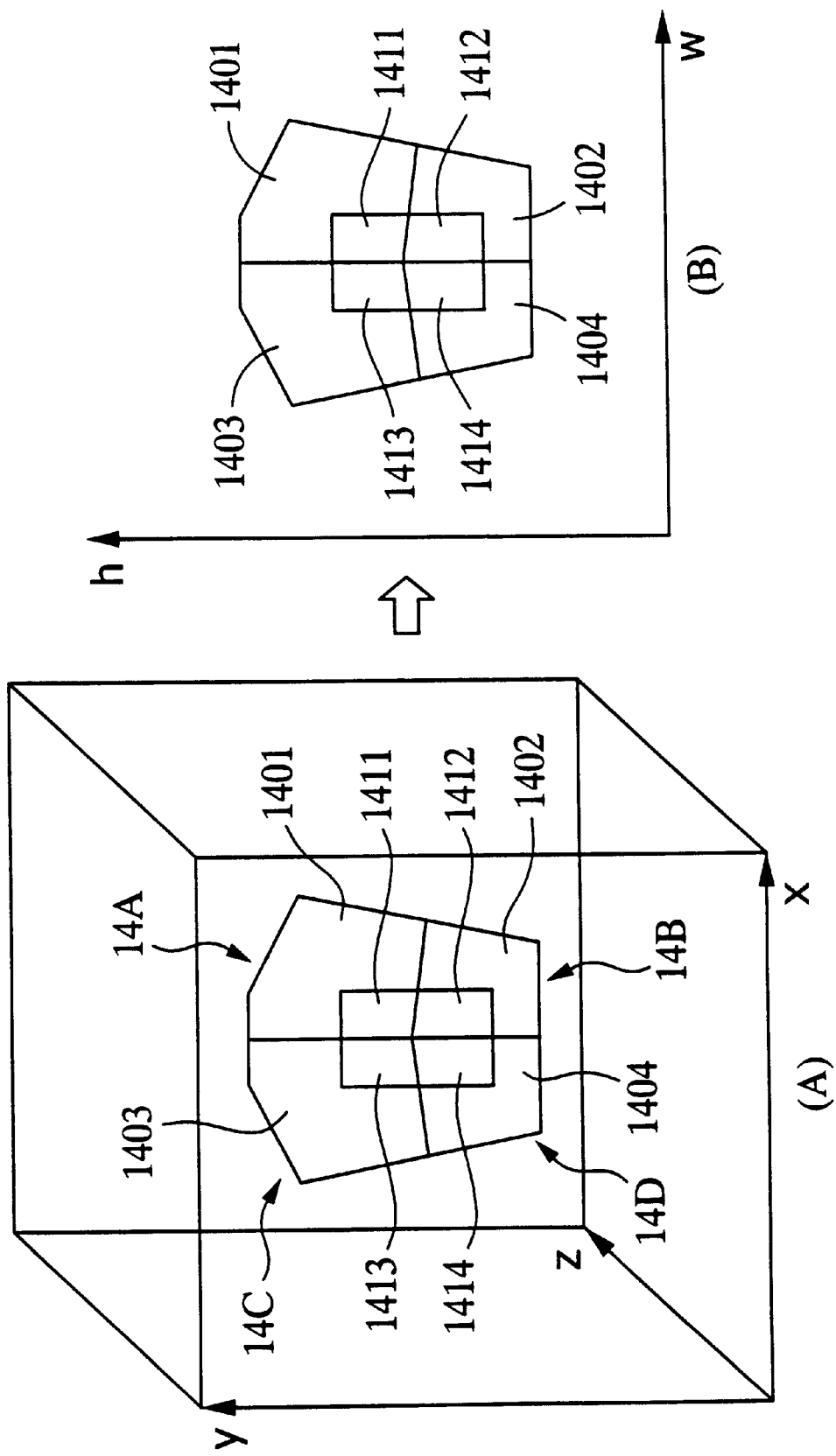
FIG. 13 describes a video game machine of a second embodiment of this invention.

The display order of the polygon data having the above-described construction is hereinafter explained by referring to FIG. 13. As shown in FIG. 13(A), polygons 1401–1404 representing the uniform and polygons 1411–1414 representing the player's number are indicated with coordinates of a three-dimensional coordinate system. The main CPU 101 (FIG. 2) performs the coordinate conversion of this three-dimensional coordinate system and generates a two-dimensional coordinate system shown in FIG. 13(B). The coordinate conversion is conducted by projecting coordinates of each vertex of polygons 1401–1404 and 1411–1414 on the two-dimensional coordinate system.

The main CPU 101 determines the priority order of polygons 1401, 1402, 1403 and 1404 respectively representing the polygon groups 14A, 14B, 14C and 14D, as well as other polygons which represent the fielder's chest, arms, etc. For example, when the fielder faces forward, that is, when his chest faces forward, his back is positioned at the back of his chest. Namely, Z-coordinate values of polygons 1401, 1402, 1403 and 1404 respectively representing the polygon groups 14A, 14B, 14C and 14D become larger than-Z-coordinate values of polygon representing the player's chest. Accordingly, in this case, the entire polygon groups 14A, 14B, 14C and 14D are not displayed, that is, the player's back is hidden behind his chest.

On the other hand, if the fielder turns his back upon the screen, the Z-coordinate values of polygons 1401, 1402, 1403 and 1404 respectively representing the polygon groups 14A, 14B, 14C and 14D become smaller than the Z-coordinate values of the polygons representing the player's chest. In this case, the polygon groups 14A, 14B, 14C and 14D are displayed with priority to the polygons representing the player's chest. For the respective polygon groups 14A, 14B, 14C and 14D, the polygons are displayed in the predetermined description order. For example, for the polygon group 14A, polygon 1411 representing the player's number is superimposed on polygon 1401 representing the uniform. In other words, the Z-coordinate values of the respective polygons in the same polygon group are not compared with each other (according to the Z-sorting method), but-the polygons are displayed in the predetermined description order.

As mentioned above, the Z-coordinate values of the respective polygons in the same polygon group are not compared with each other, but the polygons are displayed in the predetermined description order. Therefore, even if two polygons, such as the uniform polygon and the player's number polygon, are positioned very close to each other, it is possible to perform an accurate hidden face treatment. For example, as shown in the invention described in claim 10, the polygon representing the uniform and the polygon representing the player's number can be displayed accurately. Since the display order of the polygon group is decided on the basis of the Z-coordinate values of the polygon having the highest description order, it is possible to secure the compatibility between the hidden face treatment of this embodiment and the Z-sorting method.

This embodiment is not limited to the display of the player's number on the uniform, but can be applied to, for example, a number on a racing car.

(Third Embodiment)

A video game of this embodiment has the function described below in addition to those of the aforementioned video game machine of the first embodiment. The video game machine of the third embodiment of the present invention is hereinafter explained by referring to FIG. 15.

Figure 15:
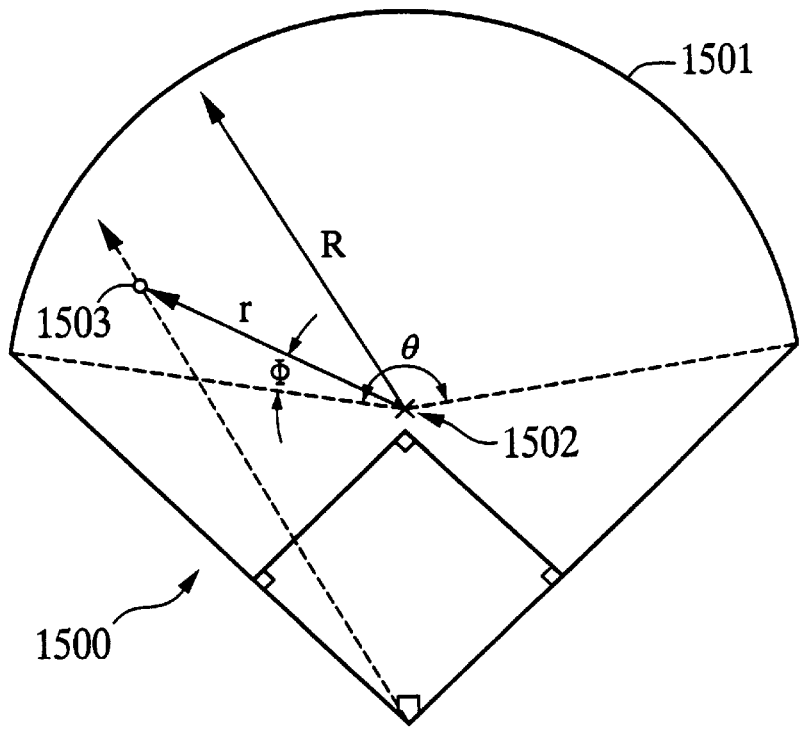
FIG. 15 explains a video game machine of a third embodiment of this invention.

FIG. 15 is an exterior view of a baseball field 1500 on the screen. A virtual center point 1502 is set at the back of the second base, and a circular arc having a radius "R" from the center point 1502 and angle "Θ" formed by two radius lines extending from the center point 1502 is displayed as an outfield fence 1501. In this figure, reference numeral 1503 indicates a ball hit by a batter. The main CPU 101 calculates the distance "r" between the center point 152 and ball 1503 and also determines whether or not angle φ shown in the figure is within angle Θ. In addition to these two conditions, if the condition is satisfied that the height of ball 1503 is higher than the outfield fence 1501, the main CPU 101 determines that ball 1503 collides with the outfield fence 1501. Then, the main CPU 101 performs the processing of bounding ball 1503 back the outfield fence 1501, and the bounded ball is shown on display 5.

According to this embodiment, it is possible to determine a collision between the ball and the outfield fence simply by means of operation of the distance "r" and it is not necessary to perform a complicated processing for determining a collision between polygons. Therefore, it is possible to easily determine the collision between the ball and the outfield fence.

(Other Embodiments)

The present invention is not limited to the above-described embodiments, but can be modified to the extent not departing from the intent of this invention. For example, this invention may be applied not only to a baseball game, but also to other games such as a soccer game or a tennis game.

Availability in the Technical Field

As described above, the following advantages can be obtained according to the present invention.

First, it is possible to display the smooth ball-catching movement. According to this invention, a collision area (virtual area) is generated at a position away from a ball (first picture) for a predetermined distance. Determining means determines whether or not a fielder (second picture) is located in the collision area. If it is determined that the fielder is in the virtual area, picture changing means changes the posture (shape) of the fielder. For example, when the fielder enters the collision area, the fielder's posture gradually changes from the waiting state to the ball-catching state. Subsequently, when the ball reaches the fielder, the fielder's posture becomes the ball-catching state. Since the collision area for collision determination is located away from the ball according to this invention, it is possible to lengthen the time spent after the fielder enters the collision area until the ball reaches the fielder. Accordingly, it is possible to secure sufficient time after the fielder begins the ball-catching movement until he completes catching the ball, that is, the time required to change the fielder's posture. Therefore, it is possible to realize the smooth ball-catching movement.

Moreover, the fielder's ball-catching posture is changed in accordance with the position of the fielder in the collision area. For example, when the fielder is in the center area of the collision area, the fielder facing the front to catch the ball is displayed. When the fielder is at the end of the collision area, the fielder turning right or left to catch the ball can be displayed. Accordingly, it is possible to display the fully realistic ball-catching movement.

Furthermore, the ball-catching movement very similar to real movement can be reproduced by changing the shape of the collision area according to the speed and position (height) of the ball. For example, when the height of the ball is high from the ground (standard plane picture), the fielder catching a fly is displayed. On the other hand, when the height of the ball is low, the fielder taking a grounder is displayed.

Secondly, it is possible to determine a collision between a batted ball and a fence by means of simple operation. According to this invention, a fence (curved-face picture) having a radius "r" from a center point is assumed and the distance "r" between the ball and the center point is calculated as appropriate. When distance "r" reaches distance "R," it is determined that the ball collides with the fence, thereby easily enabling the collision determining processing.

Thirdly, it is possible to accurately perform the hidden face treatment of polygons which are positioned very close to each other. According to this invention, the Z-coordinate values of respective polygons in the same polygon group are not compared with each other, but the polygons are displayed in a predetermined description order. Accordingly, even if two polygons, such as a uniform polygon and a player's number polygon, are positioned very close to each other, the hidden face treatment can be performed accurately. Moreover, since the display order of a polygon group is decided based on algorithm such as the Z-sorting method in the same manner as the display order of other polygons, it is possible to secure the compatibility between the hidden face treatment of this invention and the conventional hidden face treatment (for example, the Z-sorting method).

The aforementioned ROM 103 corresponds to the aforementioned memory medium and is not only mounted on the main frame of the game device, but also can be newly connected or applied to the main frame of the game device from outside of the device.

What is claimed is:

1. A picture processing device comprising:
   coordinate converting means for projecting a group of polygons represented in a three-dimensional coordinate system on a two-dimensional coordinate system; and
   hidden face treatment means for determining a display order of the polygon group relative to other polygons projected on the two-dimensional coordinate system, wherein the display order is determined based on dimensions of the depth-directional coordinate values of said three-dimensional coordinate system in a display screen and based on the depth-directional coordinate values of a representative polygon within the polygon group, and
   wherein the hidden face treatment means includes means for displaying polygons within the polygon group in accordance with a predetermined description order when the display order of the polygon group indicates that the polygon group is to be displayed.

2. A picture processing device according to claim 1, further comprising means for selecting a polygon within the polygon group having the highest description order as the representative polygon.

3. A picture processing device according to claim 1, wherein said representative polygon within the polygon group represents a player's number and another polygon within the polygon group represents a uniform.

4. A picture processing method, comprising:
   projecting a group of polygons represented in a three-dimensional coordinate system on a two-dimensional coordinate system;
   determining a display order of the polygon group relative to other polygons projected on the two-dimensional coordinate system, wherein the display order is determined based on dimensions of the depth-directional coordinate values of said three-dimensional coordinate system in a display screen and based on the depth-directional coordinate values of a representative polygon within the polygon group; and
   displaying polygons within the polygon group in accordance with a predetermined description order when the display order of the polygon group indicates that the polygon group is to be displayed.

5. A memory medium for storing the order in which a processing device executes a method described in claim 4.

6. A computer readable medium having embodied thereon a computer program for processing by a computer, the computer program comprising:
   a first code segment to project a group of polygons represented in a three-dimensional coordinate system on a two-dimensional coordinate system;
   a second code segment to determine a display order of the polygon group relative to other polygons projected on the two-dimensional coordinate system based on dimensions of the depth-directional coordinate values of the three-dimensional coordinate system in a display screen and based on the depth-directional coordinate values of a representative polygon within the polygon group; and
   a third code segment to display polygons within the polygon group in accordance with a predetermined description order when the display order of the polygon group indicates that the polygon group is to be displayed.

7. The computer program of claim 6, further comprising a fourth code segment to select a polygon within the polygon group having the highest description order as the representative polygon within the polygon group.

8. The computer program of claim 6, wherein the representative polygon within the polygon group represents a player's number and another polygon within the polygon group represents a uniform.

* * * * *